(12) United States Patent
Campbell et al.

(10) Patent No.: US 6,694,153 B1
(45) Date of Patent: Feb. 17, 2004

(54) SERVICE CONTROL POINT LOCATION REGISTER FUNCTION

(75) Inventors: Michael A. Campbell, Plano, TX (US); Susan Iskra, Richardson, TX (US); Conrad E. Labonte, Cremorne (AU); Probal Mukherjee, Plano, TX (US)

(73) Assignee: Nortel Networks Limited, St. Laurënt (CA)

( * ) Notice: Subject to any disclaimer, the term of this patent is extended or adjusted under 35 U.S.C. 154(b) by 0 days.

(21) Appl. No.: 09/475,654

(22) Filed: Dec. 30, 1999

(51) Int. Cl.$^7$ .............................................. H04M 1/00
(52) U.S. Cl. .................... 455/560; 455/433; 455/435.1; 379/221.08; 379/221.09; 379/221.12; 379/229
(58) Field of Search ................................ 455/560, 433, 455/435.1; 379/221.08, 221.09, 221.12, 229; 370/385

(56) References Cited

U.S. PATENT DOCUMENTS

| | | | | |
|---|---|---|---|---|
| 5,867,498 A | * | 2/1999 | Gillman et al. ............. | 370/385 |
| 5,905,954 A | * | 5/1999 | Nguyen ....................... | 455/433 |
| 5,917,899 A | * | 6/1999 | Moss et al. ............. | 379/221.08 |
| 5,949,857 A | * | 9/1999 | Smith, Jr. ................. | 379/93.27 |
| 5,963,630 A | * | 10/1999 | Dabbs et al. .......... | 379/201.01 |
| 6,108,409 A | * | 8/2000 | Cooper et al. ............. | 379/230 |
| 6,282,280 B1 | * | 8/2001 | Rekieta et al. .............. | 379/230 |
| 6,324,269 B1 | * | 11/2001 | Malik ..................... | 379/114.23 |
| 6,341,221 B1 | * | 1/2002 | Huotari ....................... | 455/414 |
| 6,400,818 B1 | * | 6/2002 | Madoch et al. ........ | 379/220.01 |
| 6,453,161 B1 | * | 9/2002 | Touati et al. ............... | 455/433 |

* cited by examiner

*Primary Examiner*—William Trost
*Assistant Examiner*—Stephen D'Agosta
(74) *Attorney, Agent, or Firm*—Haynes & Boone, LLP

(57) ABSTRACT

An SCP Location Register service ("SLR service") for redirecting certain DP2 and DP3 traffic to the appropriate SCP in a multi-SCP IN architecture is described. In a preferred embodiment, the SLR service of the present invention is implemented on one or more SCPs in an IN comprising multiple SCPs. In one aspect, the SLR service redirects DP3 Account Management Service queries to the correct SCP without prompting twice for the MSISDN of interest. In this aspect, the SLR prompts for and collects the MSISDN of the subscriber, maps the MSISDN to the SCP Access Code ("SAC"), prepends the SAC digits to the called number, and returns a CONNECT message to the querying MSC with the new called number in a Called Number field and the collected MSISDN in a Redirecting Party ID field. In another aspect, the SLR service redirects DP2 Origination Traffic to the correct SCP in the same manner, except that it need not prompt for or collect the MSISDN. The SLR service allows non-IN DP2 Origination traffic to pass through the network without further IN processing.

30 Claims, 3 Drawing Sheets

SERVICE CONTROL POINT LOCATION REGISTER FUNCTION

TECHNICAL FIELD

The invention relates generally to intelligent telecommunications networks ("INs") and, more particularly, to a service control point ("SCP") location register function for use in such INs.

BACKGROUND OF THE INVENTION

The European Telecommunications Standardization Institute ("ETSI") and the International Telecommunications Union ("ITU") have developed a definition of the essential capabilities needed to support the deployment of intelligent telecommunications network ("IN") services. The first version of this "capabilities set" ("CS-1") was released in March, 1992, with a revised version ("CS-1R") released in May, 1995.

In an IN, during call processing, a Service Switching Point ("SSP"), such as a Mobile Switching Center ("MSC"), for example, launches queries to a Service Control Point ("SCP") responsive to trigger Detection Points ("DPs") defined by the CS-1R call model. The queried SCP responds with commands and data for processing the call-in-progress. The Transaction Capabilities Application Protocol, or "TCAP", defines standard formats for the various query and response messages between the SSPs and the SCPs. Each query and response message includes data fields for containing a variety of pieces of information relating to the current call. For example, a TCAP query will include inter alia calling party number and called party number information, while a TCAP response will include inter alia call routing information. A DP represents a point in call processing at which an SSP can launch a query to an SCP to invoke IN service logic processing when the necessary criteria has been met.

There are many different DPs defined in the CS-1R call model. For example, DP2 is detected upon call origination; accordingly, "DP2 Origination Traffic" will be used herein to refer to call originations. DP12 is detected upon call termination; accordingly, "DP12 Termination Traffic" will be used herein to refer to call terminations. DP3 is detected based on specific set dialed digits, as defined in the SCP. If a caller places a call to that specific set of digits, DP3 is detected. The normal use of this DP is to detect calls to special numbers, such as 1-800 numbers, and trigger a dialog with the SCP to deal with them.

It is common for a wireless communications service provider to provide mobile subscribers with a telephone number, often a "1-800" number, to query an Account Management Service ("AMS") regarding certain details of the subscriber's account. In a multi-SCP IN architecture, such AMS queries (hereinafter "DP3 AMS Traffic") present a unique problem when made using a wireline telephone, rather than the subscriber's mobile unit. In particular, at the time of the call, the Mobile Subscriber's Integrated Services Directory Number ("MSISDN") of the subscriber is not known, so it is not possible to insure that the call initially is routed to the correct servicing SCP. However, the AMS must be executed by an SCP to prompt for and collect the subscriber's MSISDN, thereby requiring that the call be assigned to an SCP. This presents an interesting catch-22, in that once the MSISDN is collected, it may turn out that the SCP executing the AMS is not the SCP to which the IN is directing traffic for the subscriber identified by the MSISDN.

Other potentially problematic situations encountered in connection with multi-SCP IN architecture arise in the context of a national roaming overlay network. In particular, in a national roaming overlay network, all overlay origination traffic (hereinafter "National Roaming DP2, DP3 Origination Traffic"), including both IN and non-IN traffic, is routed from a visited network into a home network over one or more trunk groups. The traffic is routed without any additional IN processing in the visited network. This presents a problem in connection with IN traffic, which must be routed to a particular serving SCP, as there is no way to know to which SCP the traffic is to be routed, as well as non-IN traffic, which must simply be allowed to pass through with no additional IN processing in the home network.

Therefore, what is needed is a system for redirecting AMS queries, especially those made via wireline, and National Roaming DP2, DP3 Origination Traffic to the correct SCP in a multi-SCP IN architecture.

SUMMARY OF THE INVENTION

Accordingly, an SCP Location Register service ("SLR service") for redirecting certain DP2 and DP3 AMS Traffic to the appropriate SCP in a multi-SCP IN architecture is disclosed herein. In a preferred embodiment, the SLR service of the present invention is implemented on one or more SCPs in an IN comprising multiple SCPs.

In one aspect, the SLR service redirects DP3 AMS Traffic to the correct SCP without prompting twice for the MSISDN of interest. In this aspect, the network Global Title ("GT") published for AMS access (e.g., "1-800-Account-Management") is provisioned to trigger the SLR service instead of the AMS, as would typically be the case. In particular, when a subscriber dials the AMS access GT, the Mobile Switching Center ("MSC") triggers DP3, which in turn triggers InitDP to the SLR service.

Upon invocation, the SLR service looks up the called number in a Supported GT Translation ("GTT") table. If the called number is located, the SLR service prompts for and collects the MSISDN of the subscriber of interest. The SLR service then performs a lookup of the MSISDN in an SLR Subscriber table, extracts the address of the serving SCP from the SLR Subscriber table entry corresponding to the MSISDN, and looks up this information in an SCP Address Mapping table. The SLR service extracts an SCP Access Code ("SAC") of the serving SCP from the SCP Address Mapping table and prepares and returns to the requesting MSC a CONNECT message in which the SAC is prepended to the original called number. The MSISDN is placed in a Redirecting Party ID field of the CONNECT message and the original calling number is left as is. The MSC triggers on the SAC and routes the query to the SCP indicated by the SAC, which processes the AMS query without reprompting for the subscriber's MSISDN.

In another aspect, the SLR service supports redirection of National Roaming DP2, DP3 Origination Traffic. In this aspect, in the case of DP2 Origination Traffic, the caller's MSISDN is present in a Calling Number field of the incoming message. Execution of the SLR service is similar to that described above for DP3 AMS query redirection. In particular, the SLR service attempts to look up the called number in the Supported GTT table. If the number is not present, the service assumes that it has been invoked for redirection of DP2 Origination traffic. If this is the case, the calling number is a valid subscriber MSISDN; hence, the SLR service need not prompt for and/or collect the MSISDN.

As described above, the SLR service then performs a lookup of the MSISDN in the SLR Subscriber table. In the case of IN traffic, the MSISDN will be found in the SLR Subscriber table and the SLR service extracts the address of the serving SCP from the SLR Subscriber table entry and looks up this information in an SCP Address Mapping table. The SLR service extracts an SCP Access Code ("SAC") of the serving SCP from the SCP Address Mapping table. Finally, the SLR service prepares and returns to the requesting MSC a CONNECT message in which the SAC is prepended to the original called number. The MSISDN is placed in a Redirecting Party ID field of the CONNECT message and the original calling number is left as is.

In the case of non-IN traffic, the MSISDN will not be located in the SLR Subscriber table and the SLR will respond to the requesting MSC with a CONTINUE (allowing the presented call to continue with no further IN processing) or ABORT (causing the presented call to be terminated) message, rather than a CONNECT message.

A technical advantage achieved with the invention is that wireline access to an AMS in a multi-SCP network architecture can be directed to the correct SCP without twice prompting for the MSISDN of the subscriber of interest.

Another technical advantage achieved with the invention is that National Roaming Overlay traffic in a multi-SCP network architecture can be routed to the correct SCP, in the case of IN traffic, or allowed to pass through, in the case of non-IN traffic.

DESCRIPTION OF THE PREFERRED EMBODIMENT

Figure 1:
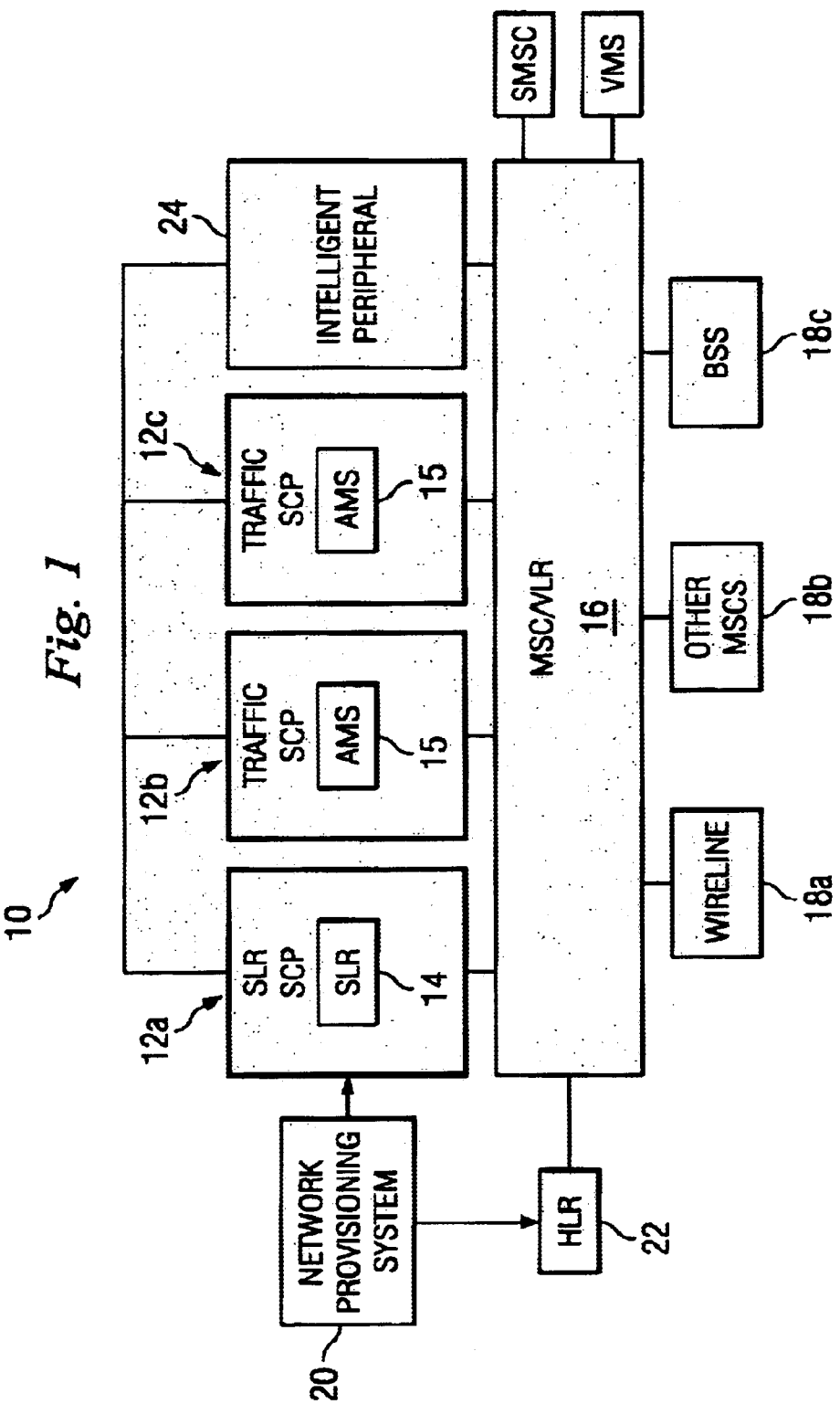
FIG. 1 is a system block diagram of a multi-SCP intelligent network ("IN") embodying features of the present invention.

FIG. 1 is a system block diagram of a telecommunications network 10 comprising an Intelligent Network ("IN") including multiple Service Control Points ("SCPs"). Specifically, the network 10 includes at least one SLR SCP 12a, as well as multiple traffic SCPs, represented in FIG. 1 by SCPs 12b and 12c. The traffic SCPs 12b, 12c, function in a conventional fashion to service calls that have been routed to them by a Mobile Switching Center ("MSC") 16, which in the preferred embodiment also encompasses a Visited Location Register ("VLR"). The SLR SCP 12a comprises an SCP executing an SCP Location Register service 14, the operation of which will be described in greater detail below. It should be noted that the network 10 may include more than one SLR SCP and that, if desired, the traffic SCPs 12b, 12c, such that they execute the SLR service 14 as well. In addition, the SCPs 12b, 12c, execute an Account Management Service ("AMS") function 15 for responding to prepaid account queries from subscribers, as described in detail below. The MSC 16 routes incoming telecommunications traffic from a variety of sources, including wireline telecommunications devices 18a, other MSCs 18b, and a one or more BSSes, represented in FIG. 1 by a BSS 18c, to the SLR SCP 12a or one of the traffic SCPs 12b, 12c, depending on the source of the traffic and the called number, as described below.

The network 10 also includes a Network Provisioning System ("NPS") 20, which provisions CAMEL Subscription Information ("CSI") or IN Index information to a Home Location Register ("HLR") 22. The NPS 20 sends consistent subscriber data to both the HLR 22 and the SLR 12a such that each knows the address of the servicing SCP for each subscriber in the network 10. The HLR 22 in turn provides subscriber information, including serving SCP if the subscriber is provisioned with CSI, to the MSC 16 as required. This information is derived from the data provided by the NPS 20. An Intelligent Peripheral ("IP") 24 provides the network 10 with its set of voice resources.

As previously indicated, in a multi-SCP network, such as the network 10, wireline access to an AMS function in connection with a prepaid account presents a unique problem in that, at the time of the call, the MSISDN of the subscriber of interest is not known, so that it is not possible initially to route the call to the appropriate SCP to service the query, but to collect an MSISDN requires that the AMS function be executed, in turn requiring that the query be assigned to an SCP.

Figure 2A:
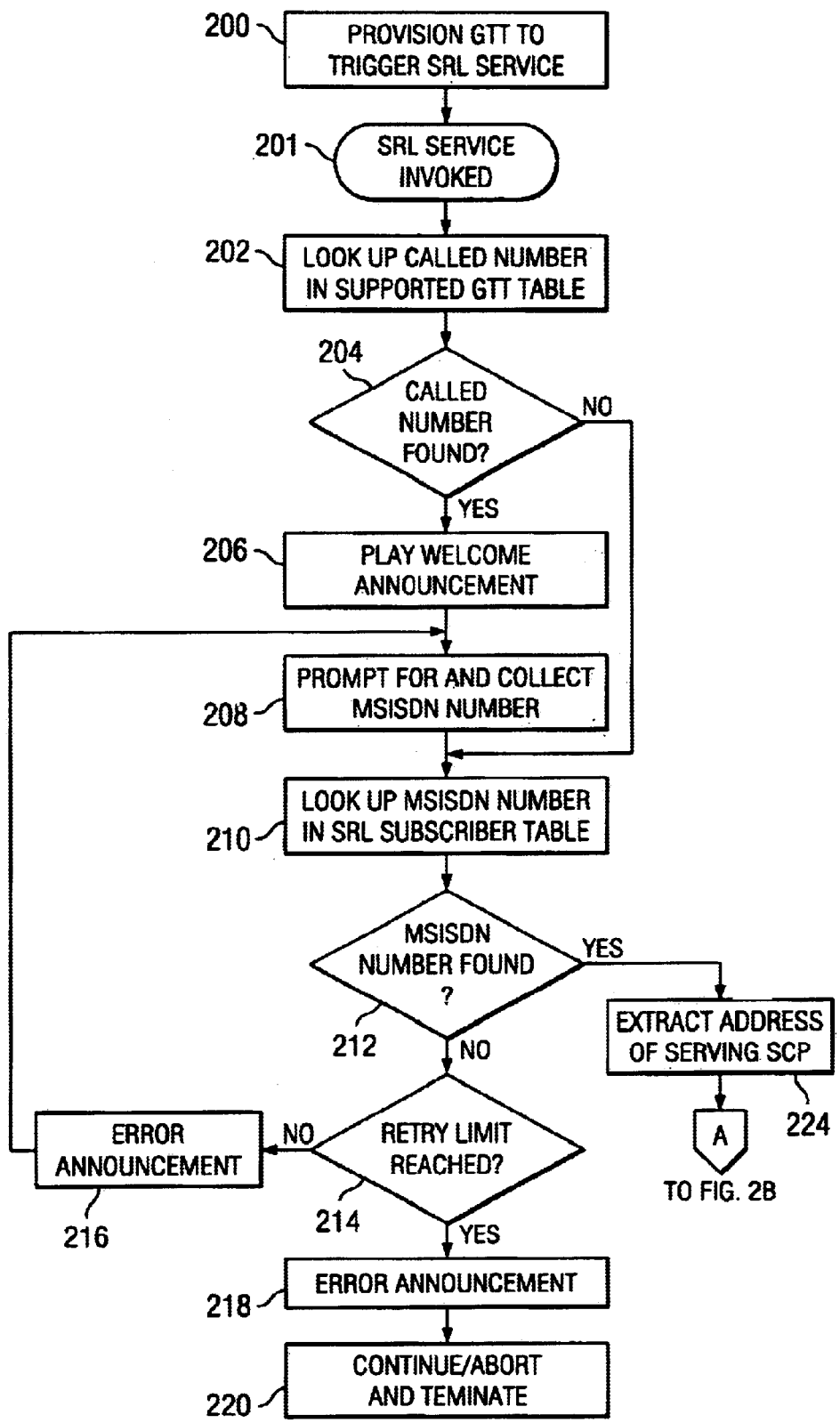
FIGS. 2A and 2B is a flowchart of the operation the present invention for redirecting DP3 AMS Traffic and National Roaming DP2, DP3 Origination Traffic to the appropriate SCP.
Figure 2B:
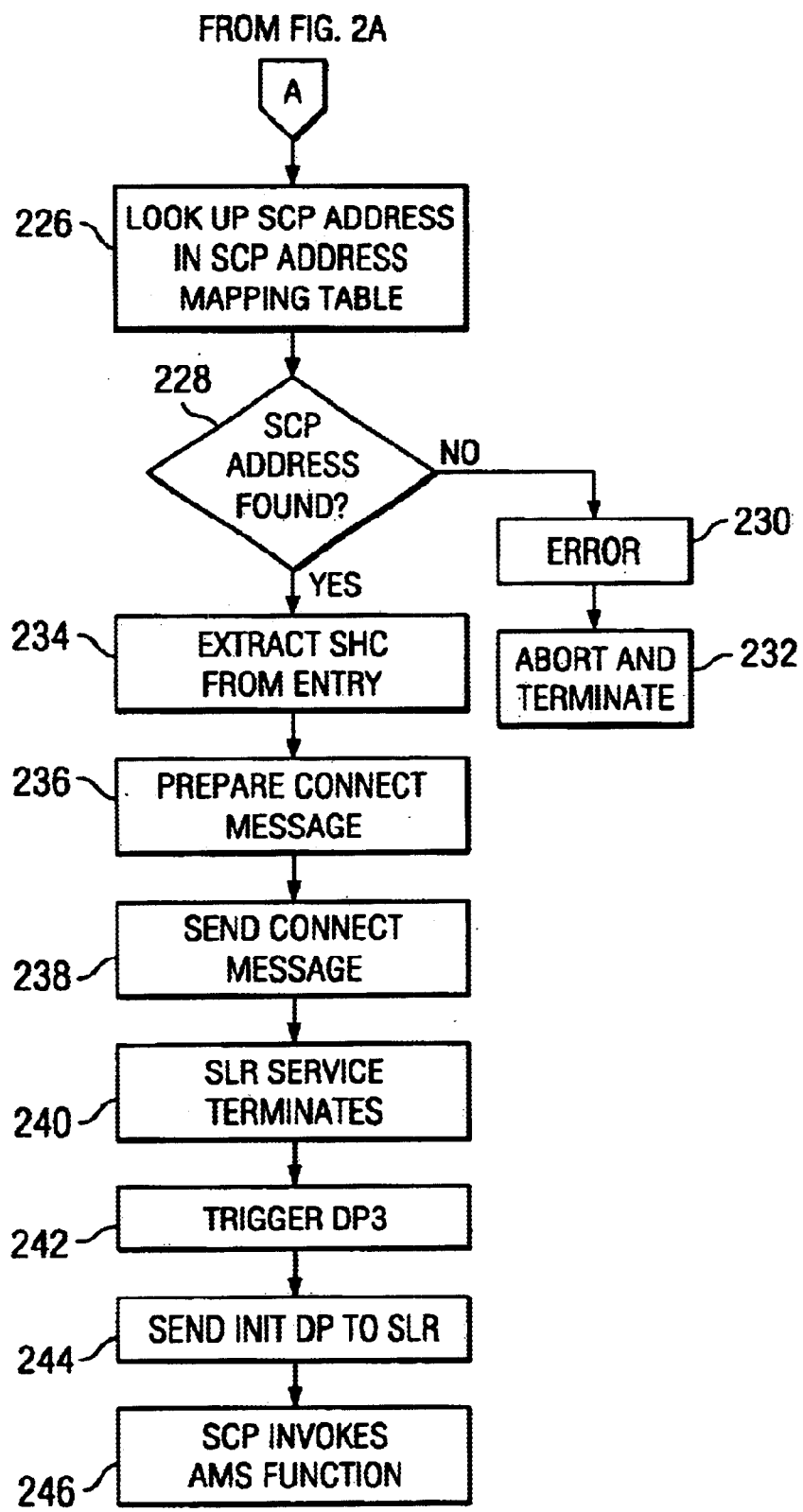

FIGS. 2A and 2B illustrates the operation of the SLR 14 to solve the above-described problem. In step 200, the NPS 20 provisions a network GT published for AMS access (hereinafter "1-800-Account-Management") to trigger the SLR service 14 instead of the AMS function 15. Upon invocation (step 201), in step 202, the SLR service 14 looks up the called number in a Supported GTT table comprising a list of all of the GTs supported by the SLR service 14. In step 204, a determination is made whether the called number exists in the Supported GTT table. If the called number does exist in the Supported GTT table, execution proceeds to step 206, in which the SLR service 14 assumes that it has been invoked to redirect an AMS query and plays a welcoming announcement, and then to step 208, in which it prompts for and collects the MSISDN of the subscriber of interest.

It will be recognized that if the AMS query originates from a wireless device, there may be an MSISDN already present in the Calling Number field of the incoming message, but prompting for and collecting an MSISDN is still desirable to allow access to any Prepaid Account from any access device. Additionally, the "prompt and collect" operation of step 208 may be multilingual, first prompting for and collecting an indication of the desired language and then continuing in the desired language.

Having collected the MSISDN in step 208, in step 210, the SLR service 14 looks up the MSISDN in an SLR Subscriber table. In step 212, a determination is made whether the number is present in the SLR Subscriber table. If not, execution proceeds to step 214, in which a determination is made whether a retry limit has been reached. If not, execution proceeds to step 216, in which an error announcement is provided, and then returns to step 208, in which the subscriber is again prompted for an MSISDN. If after a certain number of retries, e.g., three, a valid MSISDN has not been entered, the SLR service 14 assumes that the subscriber does not exist and execution proceeds to step 218, in which a different error announcement is played. In step 220, the SLR service 14 returns either a CONTINUE or ABORT message to the MSC 16. It will be noted that, in the case of DP3 Account Management redirection, the MSISDN should always be present in the SLR Subscriber table and the SLR service 14 should not encounter this situation.

Returning again to step 212, once a valid MSISDN has been entered, as indicated by an affirmative determination in step 212, execution proceeds to step 224, in which the SLR service 14 extracts the address of the serving SCP from the entry in the SLR Subscriber table corresponding to the MSISDN and looks up this information in an SCP Address Mapping table in step 226. In step 228, a determination is made whether the SCP address is present in the SCP Address Mapping table. If not, execution proceeds to step 230, in which the SLR service 14 issues an event record and a log that an error condition has occurred. In step 232, an ABORT message is returned to the requesting MSC 16 and the service 14 terminates. If an affirmative determination is made in step 228, execution proceeds to step 234, in which the SCP Access Code ("SAC") is extracted from the SCP Address Mapping table entry corresponding to the SCP address.

In step 236, the SLR service 14 prepares a response CONNECT message, which is sent to the requesting MSC 16 in step 238. In particular, the response CONNECT message comprises the original called number with the SAC prepended thereto, the MSISDN, which is placed in the Redirecting Party ID field thereof, and the original calling number, which is left as is. The SLR service 14 terminates in step 240.

In step 242, the MSC 16 receives the CONNECT message and triggers DP3 on the called number, which is now SAC+1-800-Account-Management. The resulting InitDP is sent to the SCP 12b, 12c, indicated by the SAC digits in step 244. The InitDP contains the original calling number and the new called number, with SAC prepended thereto. If a Redirecting Party ID (i.e., the collected MSISDN) was received with the SCP's CONNECT message, it is also sent to the indicated SCP in the same field of the InitDP.

At all SCPs 12b, 12c, AMS is provisioned against a called number of SAC+1-800-Account-Management. Thus, when the SCP receive the DP3 InitDP, it looks up the called number and invokes the AMS function 15. From here, call execution is per single SCP AMS execution.

As previously indicated, in a national roaming overlay network, IN traffic from visited network MSCs is routed on trunks back to a home network (e.g., the network 10) without any IN processing in the visited network. As a result, there is no way initially to determine the correct serving SCP for the incoming traffic and so it cannot be routed to the right destination. As described in detail below, use of the SLR service 14 overcomes this issue. In particular, all DP2 and DP3 incoming traffic is routed to the home network (network 10) on one or more trunks where DP3 is triggered via translation of the called number, as described above. These DP3 triggers all point to the SLR service 14, which determines the correct serving SCP and routes the call to that SCP. In a preferred embodiment, all incoming DP2 Origination Traffic is assumed to be Prepaid origination traffic, in which case the caller's MSISDN is present in the calling number field of the incoming message.

Referring again to step 204, if a determination is made that the called number is not found in the Supported GTT table, execution proceeds to step 250, in which the SLR service 14 assumes that it has been invoked for redirection of DP2 origination traffic, in which case the calling number is a valid subscriber MSISDN and the SLR service 14 need not, and does not, prompt for and collect an MSISDN. Accordingly, execution proceeds to step 210 and continues as described above.

It should be noted that a practical consequence of this arrangement is that the SLR service 14 causes the Prepaid origination service (DP2 Origination Traffic) to be invoked against DP3. This invocation method, while unusual, has been tested and is known to work properly.

In addition, Conditional Call Forwarding in a national roaming overlay network gives rise to special considerations. In particular, if the visited network is CAMEL-capable, it will deliver a call origination for the call forward leg to the home network. This origination will show the call forwarded number as the called number, the original calling party as the calling number, and the roaming subscriber's number as the Redirecting Party. There are two special cases that need to be considered under these circumstances; namely, (1) the calling party is not a home network IN subscriber, and (2) the calling party is a home network IN subscriber.

In the first case, the SLR service 14 will look up and fail to find both the called number and the calling number and hence will return a CONTINUE or an ABORT to the requesting MSC. This is the desired behavior. In the second case, without special support, the SLR service 14 would look up the calling party in the SLR Subscriber table (step 210) and find it there (step 212). As a result, this call would be sent to the SCP for that subscriber (steps 224 et seq.), who would end up being charged for the call forwarded leg. This is clearly not the desired behavior; rather, the desired behavior is for the roaming subscriber to pay for the call forwarded leg. The SLR service cannot cause the roaming subscriber to be charged for the call forwarded leg, but it can ensure that the calling subscriber is not charged for it by returning a CONTINUE message to the requesting MSC.

It is clear from the above discussion that the correct operation in both cases of call forwarding is to return a CONTINUE message to the requesting MSC. Since this is the general solution to the issue of Call Forward legs in a national roaming overlay network, the SLR service 14 recognizes that the Redirecting Party ID field in incoming calls is only populated in the case of call forwards. Accordingly, its initial processing for a call (e.g., prior to step 202) checks to see if the Redirecting Party ID is populated. If so, the SLR service 14 simply returns a CONTINUE message to the requesting MSC.

As also previously discussed, in a national roaming overlay network, all subscriber traffic originating on a visited network may be directly routed back to a home network (e.g., network 10) based on the International Mobile Subscriber Identifier ("IMSI") of the caller. In this case, the incoming trunk groups from the visited network will contain both IN and non-IN traffic. The pass through function of the SLR service 154 allows non-IN traffic to be presented to an SLR SCP 12a in the same manner as IN traffic and permitted to proceed without further IN processing. In particular, referring again to FIGS. 2A and 2B, number incoming non-IN DP2 Origination Traffic will skip the prompt and collect stage (step 208) and fail the subscriber look up stage (steps 210, 212). In this case, if the service is provisioned such that the action to take on such a failure is to respond with a CONTINUE (step 220), the presented call will be allowed to continue with no further IN processing.

As previously indicated, the network 10 may include more than the two traffic SCPs 12b, 12c, shown in FIG. 1. In addition, the network 10 may be configured such that more than one SCP is an SLR SCP and one or more such SLR SCPs may also serve as traffic SCPs capable of executing the AMS function 15.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of implementing a Service Control Point ("SCP") Service Location Register ("SLR") function in an intelligent network ("IN") comprising multiple SCPs, the method comprising:
   a Service Switching Point ("SSP") of the IN issuing a query to the SCP SLR function responsive to receipt of an incoming call meeting predefined criteria;
   responsive to receipt of the query, the SCP SLR function determining a subscriber identification number ("SIN") associated with the incoming call;
   translating the SIN into an SCP Access Code ("SAC") identifying one of the SCPs serving the SIN wherein the translating comprises:
      mapping the SIN to an address of the one of the SCPs serving the SIN; and
      determining the SAC code for the one of the SCPs; and
   responsive to a determination that the SIN has been translated to an SAC, redirecting the incoming call to the SCP identified by the SAC wherein the redirecting comprises returning a message to the SSP and the message includes the SAC.

2. The method of claim 1 wherein the SIN is a Mobile Subscriber's Integrated Services Digital Network ("MSISDN") number.

3. The method of claim 1 wherein the SSP is a Mobile Switching Center ("MSC").

4. The method of claim 1 wherein the incoming call comprises an Account Management System ("AMS") inquiry and the determining comprises the SLR prompting a caller to enter an SIN and collecting the entered SIN.

5. The method of claim 4 wherein the one of the SCPs associated with the SIN processes the AMS inquiry without reprompting for the SIN.

6. The method of claim 4 wherein the incoming call is placed using a wireline telecommunications device.

7. The method of claim 1 wherein the SIN is contained in a field of the query.

8. The method of claim 1 wherein the redirecting comprises:
   prepending the SAC code digits to a called number for the incoming call to create a new called number; and
   returning a CONNECT message to the SSP, the CONNECT message including the new called number and the determined SIN in appropriate fields of the CONNECT message.

9. The method of claim 1 wherein the incoming call requires no IN processing, the method further comprising:
   determining that the SIN cannot be translated into an SAC; and
   returning a CONTINUE or an ABORT message to the MSC.

10. The method of claim 1 wherein the incoming call is routed to the MSC from another MSC or a base station system ("BSS") of another network.

11. The method of claim 1 wherein the incoming call comprises origination traffic.

12. A method of implementing a Service Control Point ("SCP") Service Location Register ("SLR") function in an intelligent network ("IN") comprising multiple SCPs, the method comprising:
   a Service Switching Point ("SSP") of the IN issuing a query to the SCP SLR function responsive to receipt of an incoming call meeting predefined criteria;
   determining whether a Redirecting Party field of the query is populated;
   if the Redirecting Party field is populated, returning a CONTINUE message to the SSP;
   responsive to receipt of the query, the SCP SLR function determining a subscriber identification number ("SIN") associated with the incoming call;
   translating the SIN into an SCP Access Code ("SAC") identifying one of the SCPs serving the SIN; and
   responsive to a determination that the SIN has been translated to an SAC, redirecting the incoming call to the SCP identified by the SAC wherein the redirecting comprises returning a message to the SSP and the message includes the SAC.

13. A system for implementing a Service Control Point ("SCP") Service Location Register ("SLR") function in an intelligent network ("IN") comprising multiple SCPs, the system comprising:
   a Service Switching Point ("SSP") of the IN for issuing a query to the SCP SLR function responsive to receipt of an incoming call meeting predefined criteria;
   means responsive to receipt of the query for determining a subscriber identification number ("SIN") associated with the incoming call;
   means for translating the SIN into an SCP Access Code ("SAC") identifying one of the SCPs serving the SIN; and
   means responsive to a determination that the SIN has been translated to an SAC for redirecting the incoming call to the SCP identified by the SAC wherein the redirecting comprises:
      returning a message to the SSP and the message includes the SAC;
      prepending the SAC code digits to a called number for the incoming call to create a new called number; and
      returning a CONNECT message to the SSP.

14. The system of claim 13 wherein the SIN is a Mobile Subscriber's Integrated Services Digital Network ("MSISDN") number.

15. The system of claim 13 wherein the SSP is a Mobile Switching Center ("MSC").

16. The system of claim 13 wherein the incoming call comprises an Account Management System ("AMS") inquiry and the means for determining comprises means for prompting a caller to enter an SIN and collecting the entered SIN.

17. The system of claim 16 wherein the one of the SCPs associated with the SIN processes the AMS inquiry without reprompting for the SIN.

18. The system of claim 16 wherein the incoming call is placed using a wireline telecommunications device.

19. The system of claim 13 wherein the SIN is contained in a field of the query.

20. The system of claim 13 wherein the means for translating comprises:
   a SLR subscriber table for mapping the SIN to an address of the one of the SCPs serving the SIN; and
   an SCP address mapping table for mapping the address of the one of the SCPs to the SAC code therefor.

21. The system of claim 13 wherein the incoming call requires no IN processing, the system further comprising:
   means for determining that the SIN cannot be translated into an SAC; and
   means for returning a CONTINUE or an ABORT message to the MSC.

22. The system of claim 13 wherein the incoming call is routed to the MSC from another MSC or a base station system ("BSS") of another network.

23. The system of claim 13 wherein the incoming call comprises origination traffic.

24. A system for implementing an service location register ("SLR") function for a service control point ("SCP") in an intelligent network ("IN") comprising multiple SCPs, the system comprising:
 a Service Switching Point ("SSP") for detecting a trigger detection point ("DP") of an incoming call and responsive to the detecting, generating a request for service in connection with the incoming call; and
 an SCP SLR for receiving the request for service and, responsive to the receiving:
  determining an MSISDN of a subscriber in connection with the incoming call;
  mapping the MSISDN to an SCP Access Code ("SAC"), the SAC identifying a serving SCP for the MSISDN where in the mapping comprises;
   a SLR subscriber table for mapping the MSISDN to an address of the one of the SCPs serving the SIN; and
   an SCP address mapping table for mapping the address of the one of the SCPs to the SAC code therefor; and
  responsive to the MSISDN being successfully mapped to an SAC, redirecting the incoming call to the SCP identified by the SAC wherein the redirecting comprises returning a message to the SSP and the message includes the SAC.

25. The system of claim 24 wherein the detected DP is triggered by an Account Management Services ("AMS") inquiry and wherein the determining an MSISDN of a subscriber comprises prompting a subscriber to provide an MSISDN.

26. The system of claim 25 wherein the incoming call is made using a wireline telecommunications device.

27. The system of claim 24 wherein the incoming call is forwarded to the SSP from a visited network.

28. The system of claim 24 wherein the redirecting comprises the SCP SLR prepending the SAC digits to a called number to create a new called number and returning a CONNECT message to the SSP with the new called number in a called number field thereof.

29. The system of claim 24 wherein the incoming call does not require IN processing and wherein responsive to the mapping being unsuccessful, the SLR SCP returns an ABORT or a CONTINUE message to the SSP.

30. The system of claim 24 wherein the SSP is a Mobile Switching Center ("MSC").

\* \* \* \* \*